UNITED STATES PATENT OFFICE.

WILLIAM W. SKINNER AND WALTER F. BAUGHMAN, OF WASHINGTON, DISTRICT OF COLUMBIA.

PROCESS OF RECOVERING SALT FROM ITS ADMIXTURE WITH IMPURITIES IN CRUDE BRINE.

1,244,380. Specification of Letters Patent. Patented Oct. 23, 1917.

No Drawing. Application filed July 14, 1917. Serial No. 180,526.

(DEDICATED TO THE PUBLIC.)

*To all whom it may concern:*

Be it known that we, WILLIAM W. SKINNER and WALTER F. BAUGHMAN, citizens of the United States of America, and employees of the Department of Agriculture of the said United States, both residing at Washington, D. C., have invented a new and useful Improvement in Processes of Recovering Salt from its Admixture with Impurities in Crude Brine.

This application is made under the act of March 3, 1883, ch. 143 (22 Stat., 625), and the invention herein described and claimed, may be used by the Government of the United States, or any of its officers or employees, in the prosecution of work for the Government or by any person in the United States, without payment to us of any royalty thereon.

Our invention relates to improvement in the processes of recovering salt from its admixture with impurities in crude brine.

The object of our invention is to recover sodium chlorid or common salt from certain brines, which are characterized by their content of soluble barium compounds, thus making valuable for food and other purposes, a by-product, to wit, off-grade salt, sometimes designated as No. 2 and No. 3 salt, which is potentially a dangerous product when used for food purposes because of the poisonous barium compounds contained in the finished salt; and to render the hitherto off-grade salt of such a degree of purity as to permit it to be sold for food purposes or to be mixed with No. 1 salt.

This said process, hereinafter described, is used in eliminating the salts of barium from the brines of the Ohio Valley district of West Virginia and Ohio. All the salt in this district has hitherto been produced by the steam-heated or direct fired pan, or evaporator, and the grainer system. In improving these processes the problem is one of removing the barium and other impurities from the brine before it is drawn into the grainers for crystallizing out the salt, thus, if possible, eliminating it completely from any of the finished product, that is, producing a greater yield of No. 1 salt from a given quantity of brine.

In practising our invention, we dose the brine with a solution of sodium sulfate known commercially as "salt cake." The acidity of the sodium sulfate solution must first be neutralized with calcium oxid known commercally as "lime." We add an amount of sodium sulfate equivalent to the amount of barium present in the brine. The sodium sulfate solution is added to the brine in the storage tanks. It is a matter of vital importance to add just the right amount of precipitant to remove the barium and yet not a sufficient excess to produce scale. The sodium sulfate added must be free from lead and arsenic, which impurities may be anticipated in salt cake, and which it would be highly undesirable to introduce into the salt. To stir thoroughly the brine after treatment with the neutralized sodium sulfate, air is blown through the mixture for about one hour at the end of which period the ferrous bicarbonate has been broken down and a flock formed. The flock of iron hydroxid serves to coagulate the barium sulfate resulting in its more rapid and complete deposition. In order to obtain full advantage of the "flock" of iron hydroxid resulting from the decomposition of the ferrous bicarbonate naturally present in the brine in a large amount, it is advisable to add the sodium sulfate as early as possible in the process and before the brine is heated. The solution is then permitted to stand for approximately 16 hours, tests showing that practically all of the barium sulfate in suspension and a large part of the iron have settled out by this time. The treated brine is then ready to be drawn to the pre-heater, or evaporator, as needed. On account of its higher specific gravity the barium sulfate causes a more complete and rapid removal of the iron hydrate from the treated brine. We place the out-flow of the tanks one foot above the bottom so as not to disturb the deposit when the brine is drawn to the pre-heater.

The removal efficiency of barium in the tank is approximately 91 per cent. There is an additional removal from the boiling of the treated brine in the evaporators and its further concentration in the mud settlers. The determination of the barium in solution in the brine as it comes from the draw settlers practically at the point of crystallization of the salt shows that our average percentage removal of barium is approximately 94 per cent.

From the foregoing, it is thought that the operation and many advantages of the herein-described invention will be apparent to those skilled in the art, without further description, and it will be understood that various changes in the minor details of operation may be resorted to without departing from the spirit or sacrificing any of the advantages of the invention.

Having thus described our invention, we claim:

The process of recovering chlorid of sodium from its admixture with impurities in crude brine, particularly, the salts of barium, consisting of treating brine with sodium sulfate and calcium oxid, pumping air through the mixture thoroughly to incorporate the added substance with the brine and for the purposes of decomposing the ferrous bicarbonate naturally present in the brine, thus producing a flock of iron hydrate, which is carried down with the barium sulfate formed, and crystallizing the pure salt, sodium chlorid, out of the resultant solution, substantially as described.

In witness whereof, we affix our signatures in the presence of two subscribing witnesses.

WM. W. SKINNER.
WALTER F. BAUGHMAN.

Witnesses:
HAZEL NORDEMAN,
J. WALTER SALE.

Copies of this patent may be obtained for five cents each, by addressing the "Commissioner of Patents, Washington, D. C."